United States Patent [19]

Garrett

[11] 4,202,177
[45] May 13, 1980

[54] ENERGY PRODUCTION FOR COMPLEX GEOTHERMAL WATERS

[76] Inventor: Donald E. Garrett, 110 N. Bristol St., Ojai, Calif. 93023

[21] Appl. No.: 794,080

[22] Filed: May 5, 1977

[51] Int. Cl.$^2$ .................. F03G 7/00; F01K 25/08
[52] U.S. Cl. .................................. 60/641; 165/45
[58] Field of Search ............... 60/641; 166/268, 272, 166/266, 302; 165/45

[56] References Cited

U.S. PATENT DOCUMENTS

| | | | |
|---|---|---|---|
| 3,988,895 | 11/1976 | Sheinbaum | 60/641 |
| 4,060,988 | 12/1977 | Arnold | 60/641 |
| 4,079,590 | 3/1978 | Sheinbaum | 60/641 |
| 4,089,175 | 5/1978 | Woinsky | 60/641 |

Primary Examiner—Allen M. Ostrager
Attorney, Agent, or Firm—Kenneth J. Hovet

[57] ABSTRACT

A method of obtaining energy in useful form utilizing complex geothermal waters as a source of energy, the method comprising the steps of initially maintaining pressure on the hot geothermal waters to prevent vaporization, directly contacting the hot waters with at least one immiscible working fluid to effect a transfer of the heat energy from the geothermal waters to the working fluid. The heat transfer contact is preferably made in a multiple stage counter-current contact centrifuge, mixer-settlers, or a column. Solid phase heat transfer between the water and fluid may alternatively be employed such as by the use of heat pipes. The heated working fluid is thereafter separated from the geothermal waters, subjected to multiple stage vaporization and the resulting vapors are channeled to a turbine or similar working device to produce electricity. The spent working vapors are cooled and/or condensed to be recycled within the system. Optionally, dissolved chemicals present in the complex waters may be recovered from the cooled waters after the heat transfer and separation steps of the foregoing process.

34 Claims, 3 Drawing Figures

ENERGY PRODUCTION FOR COMPLEX GEOTHERMAL WATERS

BACKGROUND OF THE INVENTION

The present invention relates generally to a method of energy production, and more particularly, to an economical method for obtaining useful energy, e.g., electric power, from scaling or complex geothermal waters.

The utilization of geothermal waters throughout the world has been highly successful in only a few isolated instances, such as where a clean steam is available, or where a source of hot water or water-steam mixture is available with essentially no contaminants in the water. However, in the most common occurrences, geothermal waters are not sufficiently hot by normal steam power plant standards. Another problem is that the waters have a high content of soluble matter that tends to cuse scaling of heat exchange equipment, or by the flashing steam going to the turbines.

An extensive supply of relatively high temperature geothermal brines are found in some locations such as the Salton Sea region of California. These waters contain up to about 20% of dissolved solids. The geothermal brines possess such high temperatures and are located at such a distance below the earth's surface that they usually vaporize as the brines rise up through a pipe to the earth's surface. The resulting problems of scaling and corrosion of the pipe walls, in addition to the scaling volatile components in the steam, have caused turbines to become inoperable within periods as short as 4 to 6 hours. Further, the removal of such scale-forming constituents in the geothermal waters is exceedingly difficult. Attempts have been made to transfer the heat contained in the brine to a second fluid through conventional indirect heat exchange tubes. However, this process has suffered from the aforementioned problems of severe corrosion and difficult fouling of the tubes.

SUMMARY OF THE INVENTION

In contrast to the foregoing prior art methods, I have discovered a simple and inexpensive method which utilizes the heat energy contained in scaling or complex geothermal waters to convert the same to work and to recover energy in a useful form, e.g., electricity.

In carrying out my invention, complex or highly scaling geothermal waters are processed to recover a high percentage of their heat content by directly contacting the waters with a relatively low temperature boiling point immiscible working fluid for a sufficient residence period to effect a substantial heat transfer from the water to the fluid, vaporizing heated working fluid and utilizing the working vapors to drive turbine generators. In this manner, the scale-forming components of the geothermal brines do not contact the turbine system and power may be generated at considerably lower temperatures and relatively higher pressure than would be possible with direct vaporization of the complex brines.

The direct contact to effect a heat exchange between the hot geothermal waters and the working fluid is preferably accomplished in a counter current manner to provide for the most efficient energy recovery. The counter-current heat exchange can be effected in conventional liquid-liquid extraction towers, e.g., spray, plate, packed or other type column. However, due to the parameter of disengaging time for large volumes of liquids, and required pressurized vessels, this equipment is very large, and expensive. Alternatively, mixer-settlers are somewhat lower in cost, and less expensive to operate, but still require large disengaging vessels operating at high pressure. Much more appropriately, relatively low centrifugal force, multiple stage, counter-current centrifuges can economically handle the large volumes of fluid at elevated pressures with moderate energy consumption. Heated solids, e.g., copper spheres or other metal spheres with good heat conductivity, can also be used as an intermediate heat transfer agent from the hot brines to the working fluid in a manner such as the continuous or semi-continuous ion exchange columns.

Further, heat pipes may be used to effect heat transfer between the hot geothermal waters and the immiscible working fluid. Accordingly, in this mode, the heat pipe is oriented with one end in the hot geothermal water and the other end of the pipe in contact with the working fluid. Additionally, suspended solids having good heat conductivity may be included in the geothermal water to improve heat transfer and to reduce scale formation in the pipes.

In one embodiment, the immiscible working fluid is injected directly into the geothermal formation, i.e., down a geothermal well, to mix with the hot waters and effect a partial heat transfer. Thereafter, the heated immiscible working fluid is caused to rise to the surface with the geothermal waters. In this instance, the immiscible working fluid is the driving force in an eductor, providing the power necessary to raise both of the fluids from the well to the surface and maintain a pressure that will prevent vaporization.

If, however, the optimum pressure to be exerted on the working fluid mixture is greater than the capability of the eductor, then a down-hole pump may be used to bring the water-working fluid mixture to the surface. Once recovered at the surface, the mixture is channeled to a phase-separation means. The separation equipment effects a non-demanding phase separation of the water-immiscible fluid mixture and the immiscible phase is subsequently caused to rapidly vaporize at reduced pressure, e.g., by flash drum vaporization. Alternatively if the immiscible working fluid has been vaporized in the geothermal well, a separate vaporization step is not required. The working vapors are used to drive turbine generators which produce electricity. Thereafter, the spent working vapors are recycled for further heat exchange and vaporization, e.g., reboiling or directly re-injected into the down-hole system.

More particularly, if the heat transfer between the hot waters and working fluid is effected by direct contact, multiple stage heat exchangers such as centrifuges should be utilized. In one embodiment, at each stage an immiscible working fluid of progressively lower boiling point is directly contacted with the hot geothermal water. Thereafter, the water-fluid mixture is separated and the separated heated working fluid is directed to an individual flash chamber. The resulting working vapors are pooled and used to drive turbines to produce electricity.

These heat exchange stages are repeated as many times as the temperatures of the geothermal waters indicate practical. Accordingly, the second and later stages of contact made with the lower boiling point immiscible working fluids (secondary working fluids) provides for a higher total pressure in the turbine. The parameters of temperature and pressure for the secondary immiscible working fluids are chosen such that the summation of the individual working fluid pressures equal the total system pressure. Further, individual working fluid condensation temperature must fall within normal cooling temperatures provided by towers or other inexpensive condensing means. The contact between the cooling tower liquid and the spent working vapors from the turbines is preferably effected by direct contact. Similarly, phase disengagers are utilized to separate and return the cooled immiscible working fluid to the heat exchange circuit and the cooling liquid to the cooling tower. In this manner, a very brackish cooling water, or brine, may be used in the cooling towers without the problem of tube fouling. If geothermal fluid is used, crystallizers could be employed in the cooling tower circuit.

In the final stage of the geothermal water-working fluid-centrifuge contact, a comparatively high centrifugal force, e.g., 1000–3000 rpm, or large settling area (or both) is required to allow thorough phase separation. Since this stage may be conducted at the lowest system pressure, the construction of the large vessel will be relatively inexpensive. Additional means may be employed, e.g., adsorption with activated carbon, steam or air blowing, or other filtering devices may be used to remove the final traces of the immiscible working fluid from the geothermal water before the water is reinjected into a disposal well or further processed for chemical recovery. If several immiscible working fluids are used in the heat exchange cycle, one or more distillation columns can be employed to continuously distill a bleed stream and separate the different boiling point working fluids from one another.

DETAILED DESCRIPTION OF THE INVENTION

Figure 1:
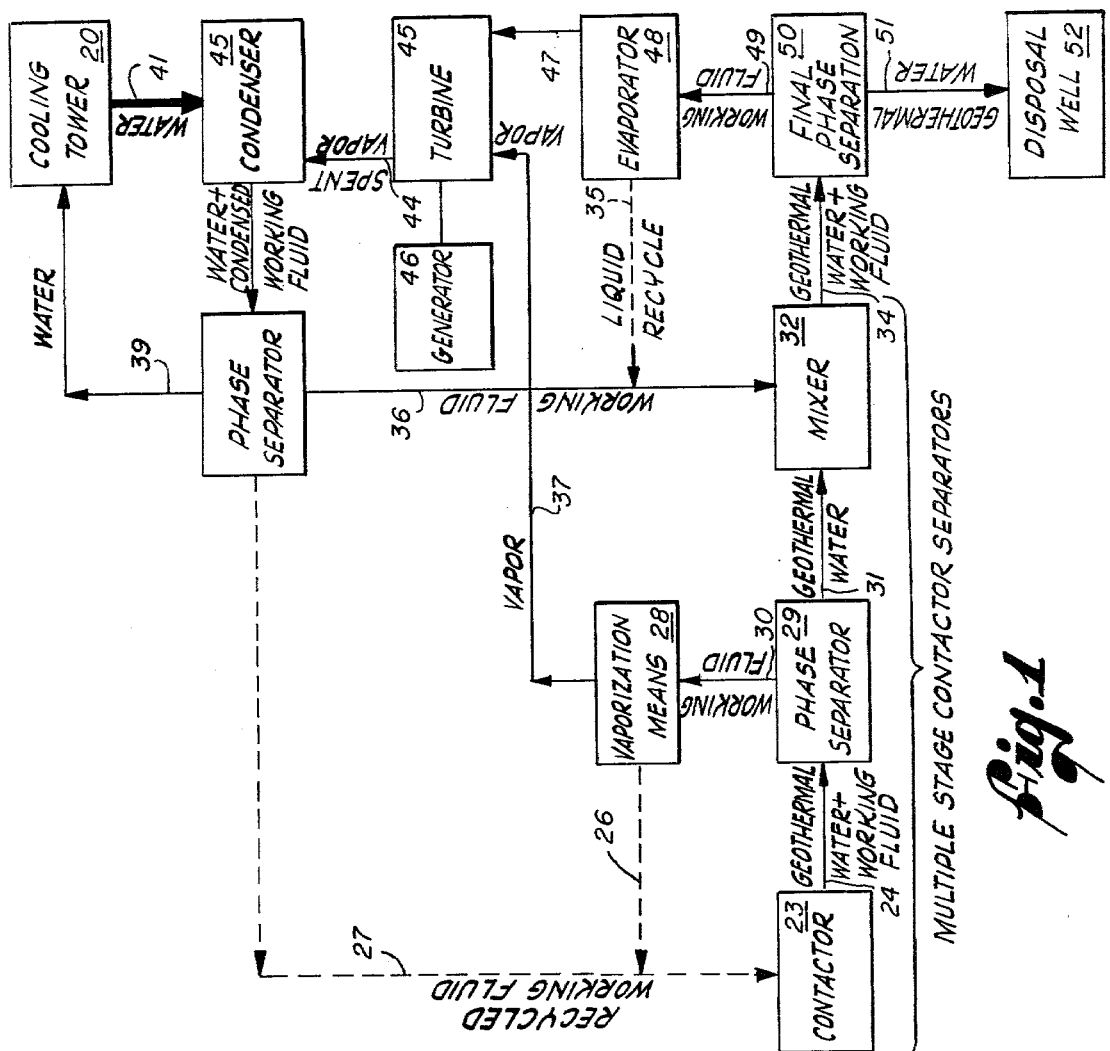
FIG. 1 is a schematic flow sheet of a geothermal power recovery process carried out in accordance with the invention.
Figure 1:
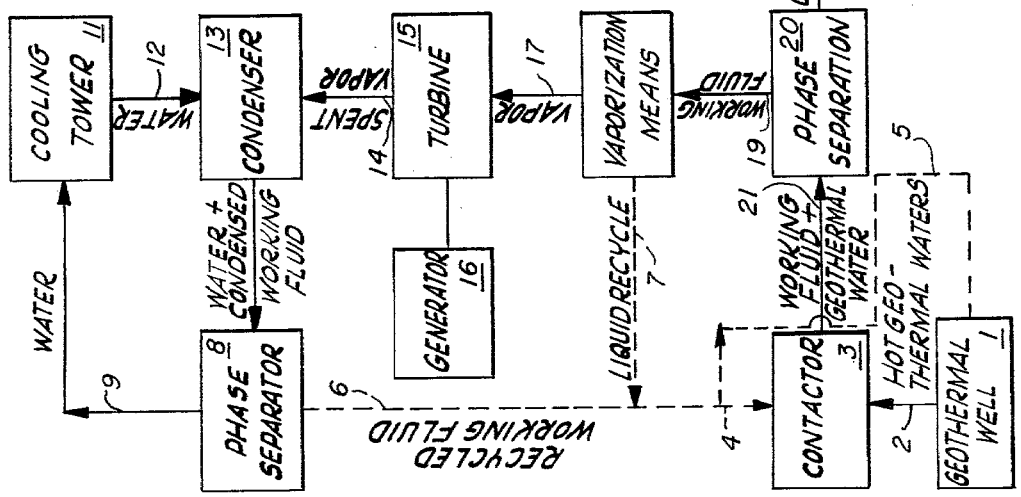

In accordance with the present invention, it has been discovered that the major problems involved in the recovery of energy from complex geothermal waters, i.e., low temperature, and scaling tendency of the waters, can be solved by the utilization of an immiscible working fluid.

In one embodiment, the immiscible working fluid, e.g., a volume of about 50,000 gallons is injected into a geothermal well. In this instance, a working fluid is selected such that the boiling point of the working fluid is close, i.e., ($\Delta T = \pm 10°$ C.) to the average temperature of the hot geothermal water source so that the working fluid contact will not generate a vast increase in pressure down-hole. Accordingly, the working fluid undergoes a marginal vaporization in the well, such as 5–10% of the initial volume, or preferably, is maintained in a liquid state. In this instance, the pressure and temperature achieved by heat exchanging the geothermal waters with the working fluid in the well and bringing the mixture to the surface will govern the selection of boiling point for the working fluid. Thus, depending upon the temperature and pressure conditions down-hole, a suitable working fluid can be chosen which optimizes the heat exchange process.

For example, it has been found that a geothermal source, such as the Salton Sea region, will provide hot geothermal waters, e.g., a volume of about 50,000 gallons down-hole at an average temperature of about 300° C. at a pressure of between 800–900 psi.

Accordingly, in a multiple stage contact process, suitable primary immiscible working fluids for first stage, surface or down-hole contact include hexanes (n-, i-, neo-), heptanes (n-, i-), cyclo-hexane, cyclo-heptane, amylchlorides and mixtures thereof. Of course those skilled in the art will readily appreciate that a wide variety of suitable organic materials are available. The parameters for selection are pressure, temperature, heat transfer, cost, phase disengagement and thermodynamic properties. Preferably, the immiscible working fluid for an initial heat transfer contact with the hot geothermal waters will have a boiling point temperature within a range of about 0° C. to 200° C. at atmospheric pressure.

More particularly, in the multiple contact embodiment, later stages of heat exchange between the warm geothermal water and working fluid, is effected with a secondary immiscible working fluid having a lower boiling point temperature, e.g., an insoluble organic material having a boiling point within a temperature range of about −100° C. to +100° C. at atmospheric pressure.

Secondary immiscible working fluids which may be used for the later stage heat exchange contact include propane, isobutane, Freons and mixtures thereof. Preferably, for very hot and mineral-laden geothermal waters, the immiscible working fluid is contacted and heat exchanged down-hole. This provides a cooling effect on the super heated geothermal waters and makes the mixture easier to handle, i.e., tends to prevent vaporization and scale formation which would result if the geothermal waters are brought to the earth's surface for heat exchange with the fluid. The working fluid, if mixed down-hole, also can provide the driving means in an eductor or gas lift to bring the hot water-working fluid mixture to the earth's surface. For those geothermal brines where pressure-temperature parameters do not render feasible an eductor or gas lift operation, a separate down-hole pump, e.g., hydraulic type or those manufactured by Reda, or Flygt, is required to pump the hot geothermal water or hot water-fluid mixture from the well to the surface, for separation and use. In this manner, the minimum pressure exerted in the well piping must be sufficient to pump the liquid to the surface, prevent backflow in the well, and prevent the geothermal water-fluid mixture from vaporizing before it reaches the surface.

After the hot geothermal water or water-working fluid mixture has been pumped to the surface, a further heat-transfer contact and phase separation are preferably effected by multiple stage, counter-current centrifuges. In the initial stages, a non-demanding phase separation is made between the hot geothermal waters and the immiscible working fluid. Typically, 0.01% of the volume of working fluid may be left unseparated from the geothermal water. Thereafter, the warm geothermal waters flow to additional contact stages, and the separated heated immiscible working fluid from the first stage contact, flows to a rapid vaporization means operating at a reduced pressure, such as a flash drum operating at a $\Delta P = -50$ psi. The resulting working vapors are directed to a turbine-generator system. Optionally, the heated immiscible working fluid from the initial separator or vaporization means can be re-injected down into the geothermal well or re-contacted with the hot water source at the surface for greater heat transfer with the geothermal waters. The spent working vapors exiting from the turbine may be condensed and recycled to the system at the vaporization step, or flowed through the entire heat exchange and separation process.

The contact of relatively warm geothermal water with a secondary immiscible working fluid allows a higher uniform total pressure to be maintained in the turbine system. Accordingly, the later stages of counter current heat exchange may be effected by a series of individual flash drums vaporizing the heated immiscible working fluid at a $\Delta T_{BP}$ of approximately 50° C. and correspondingly reduced pressures from individual associated phase disengagers. The number of stages and different immiscible working fluids will be governed by the initial temperature of the geothermal water source and can be calculable by conventional thermodynamic formulas to provide optimum heat transfer efficiency as well as economical cost. Preferably, the lowest boiling point working fluid selected will have a condensation temperature within normal cooling tower liquid temperature ranges, e.g., 10° to 20° C., or dictated by other inexpensive cooling means at or near atmospheric pressure. By using multiple stage contact and vaporization of secondary working fluids, a total system pressure may be uniformly maintained on the turbines allowing comparatively small and reasonably priced turbines to be employed for the operation.

The spent working vapors from the turbines are preferably condensed by direct contact with liquid from a cooling tower. Highly brackish water or even cooled geothermal brines can be used for the cooling liquid to condense the insoluble vapors. Phase separators, e.g., settling chambers, are again employed to disengage the cooling tower liquid from the condensed immiscible working fluid, and the immiscible fluid is returned to its respective mixer-settler for recycle.

In the last stage of phase disengagement, a comparatively large settling area is required, e.g., 20,000 to 40,000 sq. ft. to ensure that essentially all of the immiscible working fluid is separated and recovered from the geothermal brines or water. Since these vessels hold the water-working fluid mixture at near atmospheric pressure, their construction cost is fairly nominal. After the final stage of phase separation, the remaining traces of immiscible working fluid is removed, e.g., $10^{-6}\%$ of the volume of working fluid may be entrained, by treatment with activated carbon, steam or air-blowing and the spent geothermal effluent is discharged from the system. Preferably, the spent geothermal effluent is sent to a suitable chemical recovery process, e.g., solar pond type, to effect a crystallization and refinement of chemicals dissolved in the spent complex geothermal waters.

The use of immiscible working fluids for heat exchange with the complex geothermal waters, immensely decreases the problems of corrosion and equipment scaling, since the complex waters only contact the comparatively simple mixing-separation equipment. Such equipment is preferably made of corrosion-resistant materials, e.g., titanium, and designed for easy scale removal. The disengagement of solid phases, if crystallization of dissolved salts takes place during the cooling of the geothermal brines is also a factor to be considered in optimum equipment design. The design expense is greatly outweighed by the benefit which arises from the capability of achieving extremely fast heat transfer, e.g., residence time of about 10 seconds to about 1 minute for each stage of counter-current contact, with low $\Delta T$'s between the two fluids exchanging their heat. In this manner, a high percentage of the available heat in a geothermal reservoir may be recovered. In contrast, if conventional indirect heat exchange means is employed, comparatively large $\Delta T$'s are required, and as the equipment fouls, a greater $\Delta T$ is required causing a significant loss in efficiency of the energy recovery.

The advantages set forth herein may be realized by utilizing reasonably sized and priced equipment.

Counter-current contact of the hot geothermal water-working fluid mixture may be effected in a number of ways. In its simplest form, a mixer-settler method, using small mixers and large settlers may be employed for the heat transfer. This mode generally has been found to be the most economical equipment for large liquid-liquid extraction plants. In the present application, pressure vessels are required to maintain the liquid state of the volatile working fluid. Further, the mixer-settler method requires large settling areas, e.g., 20,000 to 40,000 sq. ft. to allow phase disengagement between the geothermal water and working fluid due to the large volume of water being handled, e.g., 50,000 gal.min. Accordingly, the area required is multiplied by each of the number of stages needed for high efficiency heat recovery which would be quite expensive in all but the smallest operations. Thus, at low flow rates, e.g., 1,000 to 10,000 gal./min., the required cross-sectional area for the columns will not be too extensive for this system.

It has been discovered that through the use of multiple stage liquid-liquid contact, counter-current centrifuges, very large volumes of the water, e.g., 50,000 gallons, and immiscible working fluid, e.g., 50,000 gallons, can be contacted efficiently for heat exchange and separated in a relatively small, totally enclosed system. The contact between the water and fluid to effect heat transfer does not require perfect phase disengagement. Thus the centrifugal force can be low, e.g., 200–500 revolutions per minute, and the power requirement commensurably small. Many stages can be conveniently built into such machines, and a close approach to ideal counter-current action can be obtained. The final stage contact of the warm geothermal water with the immiscible working fluid is preferably accomplished by a higher centrifugal force, e.g., 1000–3000 revolutions per minute, to insure that there is essentially no entrainment, e.g., 0.01% to 0.001% volume of working fluid/volume of geothermal water, of fluid out with the geothermal water. However, small amounts of geothermal water entrained into the organic working fluid is not a problem, since the working fluid is transferred to vaporization means after separation and is immediately returned back to the heat exchange system. Final traces of the fluid can be removed by carbon absorption, steam or air blowing, or other filtering means.

In an alternate embodiment, heat transfer between the hot geothermal water and relatively cold working fluid may be effected by means of solid-liquid contact or heat pipes. Accordingly, solids having good heat conductivity such as copper or aluminum spheres from about 0.1 to about 3 inches in diameter are suspended in the hot geothermal water. Subsequent to heating, the spheres are separated from the geothermal water and contacted with the working fluid to effect a substantial heat transfer to the working fluid of the thermal energy absorbed from the water.

In yet another embodiment, heat pipes may be utilized to transfer thermal energy of the geothermal water to the working fluid. In this mode, single or multiple heat pipes are positioned with the heat input end of the pipe in contact with the hot geothermal water and the heat output end of the pipe in the working fluid to be heated. Such a means of heat transfer is more fully disclosed in the following publications:

REFERENCES ON HEAT PIPES

Chisolm, D., *The Heat Pipe*, Mills and Boon, Ltd., London, 1971.

Feldman, K. T., and G. H. Whiting, Applications of the Heat Pipe, *Mech. Eng.*, pp. 48–53, 1968.

Nev, H., The Heat Pipe, A New Heat Transfer Device, *Euro. Spectra*, 9(2), pp. 51–59, 1970.

Ginoux, J. J., (ed.), *Heat Exchangers*, AGARD Lecture SEries, No. 57 Jan. 1972.

Asselman, G. A. A., and D. B. Green, Heat Pipes I, *Phillips Tech. Rev.*, 33(4) pp. 104–113, 1973.

Asselman, G. A. A., and D. B. Green, Heat Pipes II, *Phillips Tech. Rev.*, 33(5), pp. 138–148, 1973.

Noren, D. W., Noren Products, Inc., Hot Heat Pipes Work, *Chemical Engineering*, pp. 89–91, Aug. 19, 1974.

While the preferred mechanical working device for converting the absorbed heat energy to work is a turbine, any suitable thermodynamic motor or power generating device can be employed.

Those skilled in the art will appreciate that the parameters for the working fluid can be readily chosen to provide optimized properties for the heat transfer and vaporization steps of the present invention. Similarly, equipment for the geothermal liquid working fluid system may be selected having optimized properties such as high heat transfer efficiency and low energy requirements. The preferred mixer-settler for the system is a counter-current centrifugal contactor-separator where the geothermal liquid is directly contacted with the working fluid and subsequently separated by centrifugal force. However, suitable mixers, settlers, vaporizers, turbines, thermodynamic motors, etc. for the system can be readily chosen from a wide variety of available equipment. Equipment of the type useful in the present invention are more fully disclosed in Perry's Chemical Engineer's Handbook, 5th ed., relevant portions of which are hereby incorporated by this reference.

Referring to the drawings, and in particular, to FIG. 1, there is illustrated a schematic flow diagram depicting in general the processing sequence for the geothermal power recovery method in accordance with the present invention.

Figure 2:
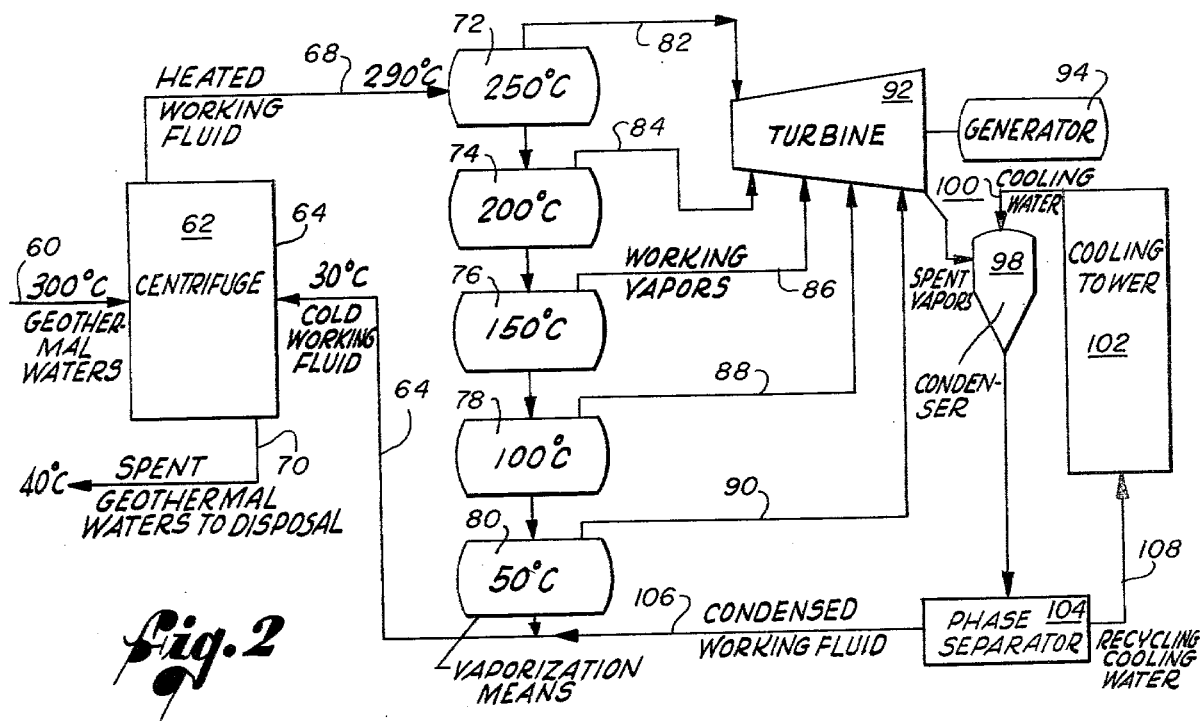
FIG. 2 illustrates a preferred embodied geothermal power recovery process.

FIG. 2 shows a schematic flow sheet of one embodied form of the foregoing power recovery process wherein a counter-current multiple stage centrifuge is utilized to perform the dual function of heat transfer contact between the hot geothermal waters and working fluid, and effecting the phase separation of the water-fluid mixture. Accordingly, hot geothermal waters derived from a geothermal formation at an average temperature of 300° C. is flowed to Podbelniak type centrifuge. An immiscible working fluid, n-hexane, having an average temperature of 30° C. is also flowed to the centrifuge. The multiple stage centrifuge effects an exceedingly rapid heat transfer contact in initial stages at transfer efficiency and low energy requirements. The preferred mixer-settler for the system is a counter-current centrifugal contactor-separator where the geothermal liquid is directly contacted with the working fluid and subsequently separated by centrifugal force. However, suitable mixers, settlers, vaporizers, turbines, thermodynamic motors, etc., for the system can be readily chosen from a wide variety of available equipment. Equipment of the type useful in the present invention are more fully disclosed in Perry's Chemical Engineer's Handbook, 5th ed., relevant portions of which are hereby incorporated by this reference.

Referring to the drawings, and in particular, to FIG. 1, there is illustrated a schematic flow diagram depicting in general the processing sequence for the geothermal power recovery method in accordance with the present invention. Working fluid (5) is blended with hot geothermal waters (2) in the well (1), or flowed through line (4) and mixed above ground at contactor (3). The fluids are then sent as mixture (21) to phase separator (20) where the working fluid (19) and water (22) are separated. The working fluid is flashed at vaporizer (18) to provide vapor (17) for the turbine (15), which drives the generator (16). Liquid (7) not vaporized is recycled back to the contactor (3) or well (1).

The discharge vapors (14) are condensed at condenser (13) by direct contact with water (12) from cooling tower (11). After phase separation in separator (8) of the water/working fluid mixture (10), the recycled working fluid (6) is returned to again contact the geothermal water (2) either in the well (1) or contactor (3). The recovered water (9) is returned to the cooling tower.

Additional contact stages (23) with phase separators (29), such as heat exchange centrifuges, are then employed on the geothermal waters (22) and (24). For these additional stages, it will be appreciated that the working fluid may be the same as that initially used at well (1) and contactor (3) or it may be a secondary working fluid as described hereinabove.

The hot working fluid (30) is sent through flash vaporization chambers (28) where the working fluid (26) is recycled and the vapors (37) are used to power a turbine (45) and generator (46) which could be the same units as previously described with reference numerals (15) and (16).

The spent vapor (44) is condensed at condenser (42,13), and the working fluid recycled through line (27) or (6) by condensing treatment at condenser (42) with water (41) from cooling tower (40). The condensing treatment is followed by phase separation of the mixture (43) at separator (38). The water phase (39) is returned to the cooling tower (40).

Geothermal water (31) from phase separator(s) (29) is combined with working fluid (36) from phase separator (38) in mixer (32) to illustrate the final stages of maximizing heat recovery. The mixture (34) is separated at (50) with the working fluid (49) entering evaporator (48) with the vaporized fluid (47) driving the aforementioned turbine (45). Fluid (35) not vaporized is returned to mixer (32). The spent cold geothermal fluid (51) is sent to disposal wells (52) or otherwise removed.

FIG. 2 shows a schematic flow sheet of one embodied form of the foregoing power recovery process wherein a counter-current multiple stage centrifuge is utilized to perform the dual function of heat transfer contact between the hot geothermal waters and working fluid, and effecting the phase separation of the water-fluid mixture. Accordingly, hot geothermal waters (60) derived from a geothermal formation at an average temperature of 300° C. is flowed to Podbelniak type centrifuge (62). An immiscible working fluid (such as hexane) (64), having an average temperature of 30° C. is also flowed to the centrifuge and in some cases, to the well through line (66).

The multiple stage centrifuge effects an exceedingly rapid heat transfer contact in initial stages at relatively low centrifugal force, 300 rpm, and effects a phase separation between the geothermal water and immiscible working fluid in a final stage at a relatively high centrifugal force, 1000 rpm. The separated heated working fluid (68), now at a temperature of approximately 290° C., is flowed to the system's vaporization means while the spent geothermal waters (70), at approximately 40° C. are flowed to a disposal well.

The vaporization means depicted in FIG. 2 is a multiple stage flash drum type which has five separate stages (72, 74, 76, 78, and 80) for vaporizing the working fluid. The first stage of vaporization (72) takes place at a temperature of about 250° C. at a correspondingly reduced pressure, $\Delta P = 50$ psi from initial system pressure of about 300 psi. The second stage flash drum (74) accordingly vaporizes the remaining working fluid at 200° C. at a further reduction in pressure, $\Delta P = 40$ psi. Similarly, the latter stages of flash drums are operated at a $\Delta T_{BP} = -50°$ C.

Working vapors (82, 84, 86, 88, and 90) derived from the multiple stages of flash drums are fed to a turbine (92)-generator (94) system for converting the thermodynamic energy in the working vapors to electricity. Thereafter, the spent working vapors (96) are flowed to a condenser (98) where cooling water (100) from a tower (102) condenses the vapors by direct contact for recycle within the above-described system. A phase separator (104) such as a settling chamber is utilized for separating the condensed working fluid (106) from the cooling water and the separated cooling water is recycled at (108) to the associated cooling tower.

Figure 3:
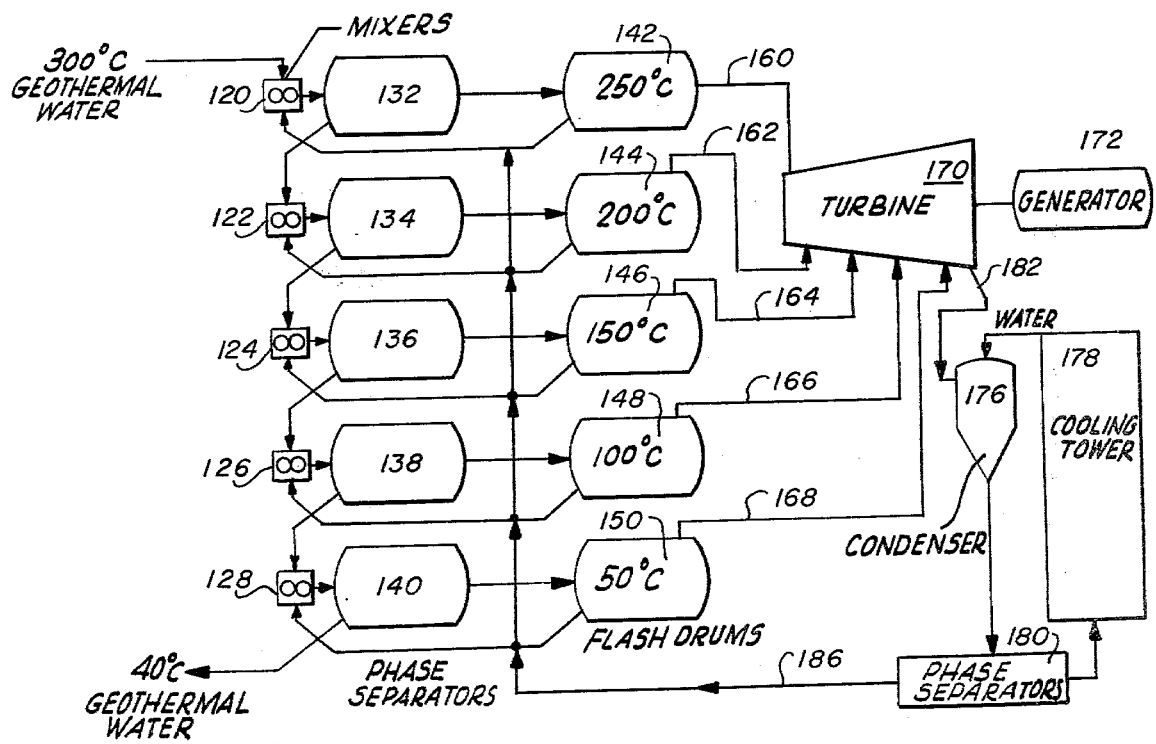
FIG. 3 is another schematic diagram of a second embodied geothermal power recovery process carried out in accordance with the invention.

FIG. 3 illustrates yet another embodied geothermal power recovery system wherein individual mixers (120, 122, 124, 126, and 128) are utilized for performing the heat transfer contact between the geothermal water-immiscible working fluid mixture. Similarly, as in the recovery system depicted in FIG. 2, the individual phase separators (132, 134, 136, 138 and 140) are provided with associated flash drums (142, 144, 146, 148 and 150) operating at a $\Delta T_{BP} = -50°$ C. and $\Delta P = 50$ psi in each stage. The working vapors (160, 162, 164, 166 and 168) thereby produced are fed to a turbine (170)-generator (172) system for converting the thermodynamic energy in the working vapors to electricity. Accordingly, the foregoing system is provided with a condenser (176), cooling tower (178), and phase separator (180) for effecting the condensation of the spent vapors (182) and recycle (186) in the aforedescribed manner of FIG. 2.

It will be apparent from the preceding discussion that the invention provides an improved process for power recovery from a geothermal source. In general, the entire system is simple and inexpensive, and due to the very close $\Delta T$'s allowable between the two fluid heat exchange, and the ability of the lower boiling point fluids to operate at a comparatively low temperature, the system is relatively thermally efficient and provides for an ease of operation, maintenance, low capital cost and high energy recovery.

I claim:

1. A method for utilizing geothermal fluid from a well as a source of energy to produce work, the method comprising the steps of:
    effecting an initial contact within the confines of said well between the geothermal fluid and an immiscible working fluid for a sufficient residence period to effect a heat transfer from the geothermal fluid to the working fluid;
    flowing the resultant geothermal fluid-working fluid mixture to the surface;
    separating the heated working fluid from substantially all the geothermal fluid;
    rapidly varporizing the working fluid and utilizing the resulting vapors to operate a mechanical working device to produce work.

2. The method of claim 1 wherein a member selected from the group consisting of an eductor, gas lift or pump is utilized for flowing the geothermal fluid-working fluid mixture to the surface.

3. The method of claim 1 wherein the immiscible working fluid has a boiling point within a temperature range of between about 0° C. and about 200° C. at atmospheric pressure.

4. The method of claim 1 wherein the immiscible working fluid is selected from the group consisting of hexanes, heptanes, amylchlorides and mixtures thereof.

5. The method of claim 1 wherein the step of rapidly vaporizing the working fluid is effected in at least one flash drum vessel.

6. The method of claim 1 wherein said mechanical working device is a vapor-driven turbine.

7. The method of claim 1 and further including the step of recovering dissolved chemicals in the geothermal fluid subsequent to the step of separating the heated working fluid from the geothermal water.

8. The method of claim 7 wherein said step of recovering dissolved chemicals is performed by an evaporation and crystallization process utilizing solar ponds.

9. The method of claim 1 and further including the step of removing trace quantities of working fluid entrained in the geothermal fluid after said separating step by means selected from the group consisting of carbon adsorption, steam blowing, air blowing or resin-extraction.

10. The method of claim 1 including the step of recovering said working fluid from the working device by condensation.

11. The method of claim 10 wherein said recovered fluid is recycled to said well.

12. The method of claim 10 including additional contacts with the geothermal fluid and at least one additional immiscible working fluid having progressively lower boiling points followed by respective fluid-working fluid phase separation steps.

13. The method of claim 12 wherein said initial contact with the geothermal fluid is effected by utilizing a first immiscible working fluid selected from the group consisting of hexanes, heptanes, amylchlorides and mixtures thereof.

14. The method of claim 13 wherein said at least one additional contact with the geothermal fluid is effected by utilizing a second immiscible working fluid selected from the group consisting of isobutanes, propanes, Freons and mixtures thereof.

15. The method of claim 12 wherein said additional contacts are effected in at least one direct contact counter-current liquid contact column.

16. The method of claim 12 wherein said additional contacts are effected in a direct contact mixer-settler device.

17. The method of claim 12 wherein said additional contacts are effected by intermediate heat transfer contact with metal spheres.

18. The method of claim 12 wherein said additional contacts are effected by utilizing at least one heat pipe.

19. The method of claim 12 and further including the step of recovering each of the working fluids and recycling them for use with said additional corresponding contacts.

20. The method of claim 12 wherein said additional contacts are effected in at least one direct contact counter-current centrifuge.

21. The method of claim 20 wherein said centrifuge is a multiple-stage apparatus capable of exerting a relative low centrifugal force in an initial stage and a relatively high centrifugal force in a final stage of contact.

22. The method of claim 21 wherein said relatively low centrifugal force is within a range of between about 200 rpm to about 500 rpm, and said relatively high centrifugal force is within a range of between about 1,000 rpm to about 3,000 rpm.

23. A method of obtaining work from scaling and complex geothermal fluid, the method comprising the steps of:
providing a well that penetrates a formation containing said geothermal fluid;
forming a mixture within the confines of said well by directly contacting said geothermal fluid contained therein with an immiscible working fluid for a sufficient residence time to effect a substantial heat transfer of heat energy contained in the geothermal fluid to the immiscible working fluid;
recovering the geothermal fluid-immiscible working fluid mixture from said well confines;
processing the geothermal fluid-working fluid mixture to effect a substantial phase separation of the mixture;
separating the resulting heated working fluid from substantially all the geothermal fluid;
rapidly vaporizing the heated immiscible working fluid and utilizing the vapors obtained from the rapid vaporizing step to power a turbine which produces work, and thereafter condensing spent working vapors derived from the turbine for recycling.

24. The method of claim 23 wherein the working fluid is selected from the group consisting of hexanes, heptanes, amylchlorides and mixtures thereof.

25. The method of claim 23 wherein the step of recovering the geothermal water-working fluid mixture from the geothermal formation is effected by utilizing a hydraulic pump located in the geothermal formation.

26. The method of claim 23 wherein the step of recovering the geothermal water-working fluid mixture from the geothermal formation is accomplished by means of an eductor.

27. The method of claim 23 wherein the step of condensing the spent working vapors for recycling is accomplished by contacting said vapors with cooling water from a cooling tower.

28. The method of claim 23 wherein the condensed working vapors are recycled for contact with the geothermal fluid within said well.

29. The method of claim 23 wherein the condensed working vapors are recycled for use in subsequent above ground contact processes.

30. The method of claim 23 wherein the immiscible working fluid has a boiling point within a temperature range of between about 0° C. and about 200° C. at atmospheric pressure.

31. The method of claim 23 wherein the step of recovering the geothermal fluid-working fluid mixture from the geothermal formation is accomplished by means of a working fluid vapor gas lift.

32. The method of claim 29 wherein the subsequent contact processes comprise multiple-stage contact processes utilizing multiple immiscible working fluids having progressively lower boiling points.

33. The method of claim 32 wherein said direct contact with the geothermal fluid is effected by utilizing a first immiscible working fluid selected from the group consisting of hexanes, heptanes, amylchlorides and mixtures thereof.

34. The method of claim 33 wherein a subsequent contact with the geothermal fluid is effected by utilizing a second immiscible working fluid selected from the group consisting of isobutanes, propanes, Freons and mixtures thereof.

* * * * *